(12) United States Patent
Ma et al.

(10) Patent No.: US 12,513,076 B2
(45) Date of Patent: Dec. 30, 2025

(54) DELAY SENSITIVE NETWORK ESTIMATION SYSTEM

(71) Applicant: WiSys Technology Foundation, Inc., Madison, WI (US)

(72) Inventors: Xiaoguang Ma, Platteville, WI (US); Huan Yang, Guangdong (CN)

(73) Assignee: WISYS TECHNOLOGY FOUNDATION, INC., Madison, WI (US)

( * ) Notice: Subject to any disclaimer, the term of this patent is extended or adjusted under 35 U.S.C. 154(b) by 125 days.

(21) Appl. No.: 17/887,286

(22) Filed: Aug. 12, 2022

(65) Prior Publication Data

US 2023/0051166 A1    Feb. 16, 2023

Related U.S. Application Data

(60) Provisional application No. 63/236,869, filed on Aug. 25, 2021, provisional application No. 63/232,370, filed on Aug. 12, 2021.

(51) Int. Cl.
*H04L 45/121* (2022.01)
*H04L 47/2425* (2022.01)

(52) U.S. Cl.
CPC ........ *H04L 45/121* (2013.01); *H04L 47/2433* (2013.01)

(58) Field of Classification Search
CPC .............. H04L 45/121; H04L 47/2433
See application file for complete search history.

(56) References Cited

U.S. PATENT DOCUMENTS

| | | | |
|---|---|---|---|
| 2015/0319077 A1* | 11/2015 | Vasseur | H04L 45/44 370/238 |
| 2020/0259896 A1* | 8/2020 | Sachs | H04L 67/60 |
| 2021/0297362 A1* | 9/2021 | Eckert | H04L 47/32 |
| 2022/0078080 A1* | 3/2022 | Ginthoer | H04L 45/302 |
| 2022/0263765 A1* | 8/2022 | Chen | H04L 47/2425 |
| 2023/0308400 A1* | 9/2023 | Fons Lluis | H04L 45/52 |

OTHER PUBLICATIONS

IEEE Standards for a Precision Clock Synchronization Protocol for Networked Measurement and Control systems. (Year: 2019).*
Huan Yang et al.; "Combining measurements and network calculus in worst-case delay analyses for networked cyber-physical systems." In IEEE INFOCOM 2019-IEEE Conference on Computer Communications Workshops (INFOCOM WKSHPS), pp. 1065-1066. IEEE, 2019.
Huan Yang et al.; "Analyzing worst-case delay performance of IEC 61850-9-2 process bus networks using measurements and network calculus." In Proceedings of the Eighth International Conference on Future Energy Systems, pp. 12-22. 2017.

* cited by examiner

*Primary Examiner* — Jung H Park
(74) *Attorney, Agent, or Firm* — Boyle Fredrickson, S.C.

(57) ABSTRACT

A network traffic management system prepares a map showing network delays updated through the transmission of regularly time-stamped messages. This map is then employed to prioritize packets, address quality of service requirements, or drop expired/expiring packets.

10 Claims, 8 Drawing Sheets

DELAY SENSITIVE NETWORK ESTIMATION SYSTEM

CROSS REFERENCE TO RELATED APPLICATION

The present application claims the benefit of U.S. provisional applications 63/232,370 filed Aug. 12, 2021 and U.S. provisional application 63/236,869 filed Aug. 25, 2021, both hereby incorporated by reference.

STATEMENT REGARDING FEDERALLY SPONSORED RESEARCH OR DEVELOPMENT

—

BACKGROUND OF THE INVENTION

The present invention relates to devices for monitoring transmission delays experienced by packets over a network, and in particular to a delay sensitive communication system. This invention measures and predicts network delay to make switching/routing decisions or admission control decisions, e.g., dynamic queueing adjustments or proactive packet dropping.

With the development of modern communication networks, the demand for higher throughputs and lower latency has grown. For example, for media services, the current prevailing 4K/8K HD video requires 35-140 Mbps with 15-35 ms delay, while emerging VR/AR technology requires 25 M-5 GBps throughput with 5-7 millisecond delay. These high throughput and low latency requirements will only continue to grow as technology advances further into holographic type communications and beyond.

The Internet's fundamental statistical multiplexing and best effort forwarding schemes can result in network congestion that defeats the desire for high throughput and low latency even for specially designated packets (per QoS). One solution to this problem is so-called "Time-Sensitive Networking" (TSN), which establishes a set of synchronized clocks at each intermediary devices for example, a switch or router between network conductors. These synchronized clocks are then used to adopt a deterministic schedule for traffic between any two intermediary devices.

For mission-critical, time-critical and/or delay-sensitive applications, freshness of information has become an important performance metric impacting system operability and reliability. To ensure timely delivery of data and control commands, the transmission schedule of queued network frames at any particular network intermediary device needs to be determined dynamically with respect to temporal constraints such as delivery deadlines. Additionally, to conserve network bandwidth, network frames that are bound to miss their deadlines should be dropped as early as possible. The realizations of both mechanisms demand the incorporation of delay monitoring/estimation capabilities for the underlying network infrastructure.

SUMMARY OF THE INVENTION

With current TSN applications, expired data frames/packets will be dropped at the end host. The efforts of transmitting already expiring/expired frames/packets are futile and may cause consecutive frame expirations and worsen the network congestion. Furthermore, in Software-Defined Networks (SDNs), many existing load balancing mechanisms can only achieve sub-optimal path-selection solutions mainly due to the lack of accurate delay estimation methods. For example, the estimation of path delay information can be leveraged to replace "link cost" in OSPF (Open Shortest Path First) protocol to improve dynamic path selections and load balancing.

The present inventors propose a delay estimation system, which generates and utilizes an estimation of a real-time map of network delays to improve network efficiency and ensure information freshness. With the proposed system, the network devices (switches/routers) can perform early detections of the expiring/expired frames/packets, and the SDN can execute administrative decisions, including proactive packet-dropping (dropping the expiring/expired frames/packets to reduce the network congestion), delay-optimized load balancing (sending the packets through different paths to satisfy the delay requirements), and dynamic QoS provisioning (elevating the QoS of the frames/packets to ensure on-time delivery).

In this regard, the invention continuously monitors the real-time end-to-end delay among all the active nodes in a network with high precision and estimates the future network delay with innovative network-calculus models. In one embodiment, the invention determines hop-by-hop and end-to-end delays for Time-Sensitive Networking (TSN) and similar time-sensitive networks integrating high precision level (up to 100-ns) timestamps into network messages with two different methods, the Data-link-layer Precision Trailer (DPT) method and the Transport-layer End-to-end Active Messaging (TEAM) method as will be discussed below.

Once the hop-by-hop or end-to-end delays have been determined, a real-time map of the delays across the network is created, based on which the estimations of future delay performance are established or updated. The delay map and the estimations are stored on each intermediary device so that it can make intelligent administrative decisions. Some of the objects and advantages of implementing the PDM protocol and utilizing the real-time delay map are listed below:

- improving the throughput by early dropping the expiring/expired packets for high prevision communication;
- reducing network congestion by load-balancing time-insensitive packets while maintaining time-critical packet delivery constraints;
- reducing cost with adaptive QoS requirements (packet priority becomes per-hop behavior with accurate delay information, hence reducing the QoS requirement to the internet service provider);
- reducing the overall packet drop rate by ensuring guaranteed timely delivery;
- minimizing jitter;
- providing an estimated time of arrival (ETA) to the data sending applications to make the transmission more predictable and reliable;
- altering of possible cyber-attacks or network equipment malfunctions; and
- supporting new high-precision communication services with a reliable real-time measurability infrastructure.

These objects and advantages of the invention as well as others will be further described in the detailed description of the preferred embodiment.

DETAILED DESCRIPTION OF THE PREFERRED EMBODIMENT

Figure 1:
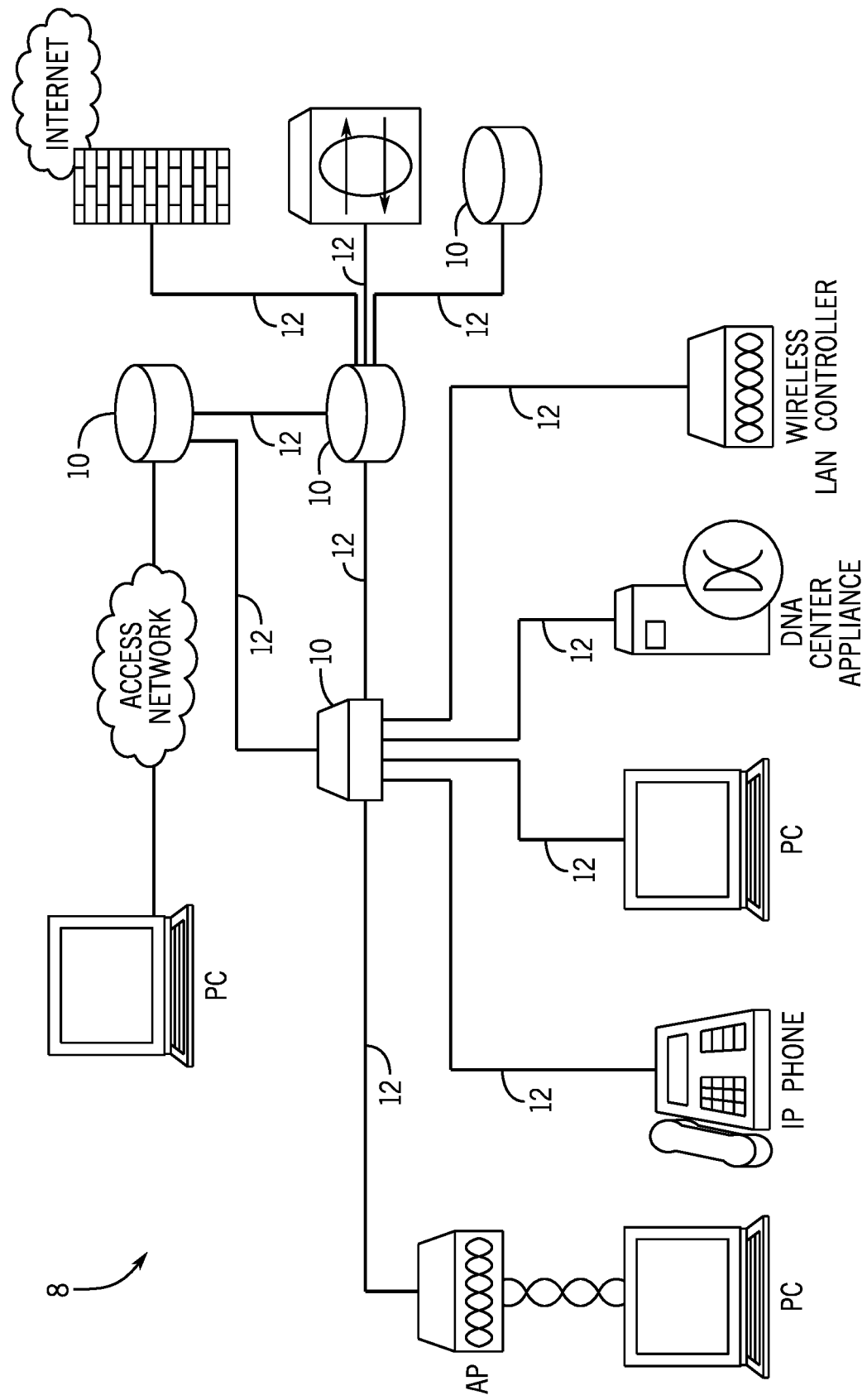
FIG. 1 is a simplified illustration of a network.

Referring to FIG. 1, a simplified network map is shown. The network 8 physically consists of intermediary device 10 (generally including switches, routers, and the like) connected by path 12 (such as cabling and radio links) so that the device 10 may communicate with each other and send packets 58 of information where they need to go. Depending on the level of traffic being communicated over the path 12 and other factors, delays over the network 8 may occur. The different paths 12 among these devices 10 may have differing delays. When time sensitive information is sent over the path 12, the unexpected delays may occur during the packets 58 being forwarded such that the information does not reach its destination within an acceptable timeframe. The present precision delay monitoring protocol offers a cost-effective solution to continuously monitor the delays among active nodes in the network with up to sub-microsecond level precision in LAN or synched WAN networks and uses this real-time map 48 to achieve that. In the following descriptions, the "packet" is used as a general term referring to either layer 2 network frames, layer 3 data packets, or layer 4 segments/datagrams depending on the context.

Figure 2:
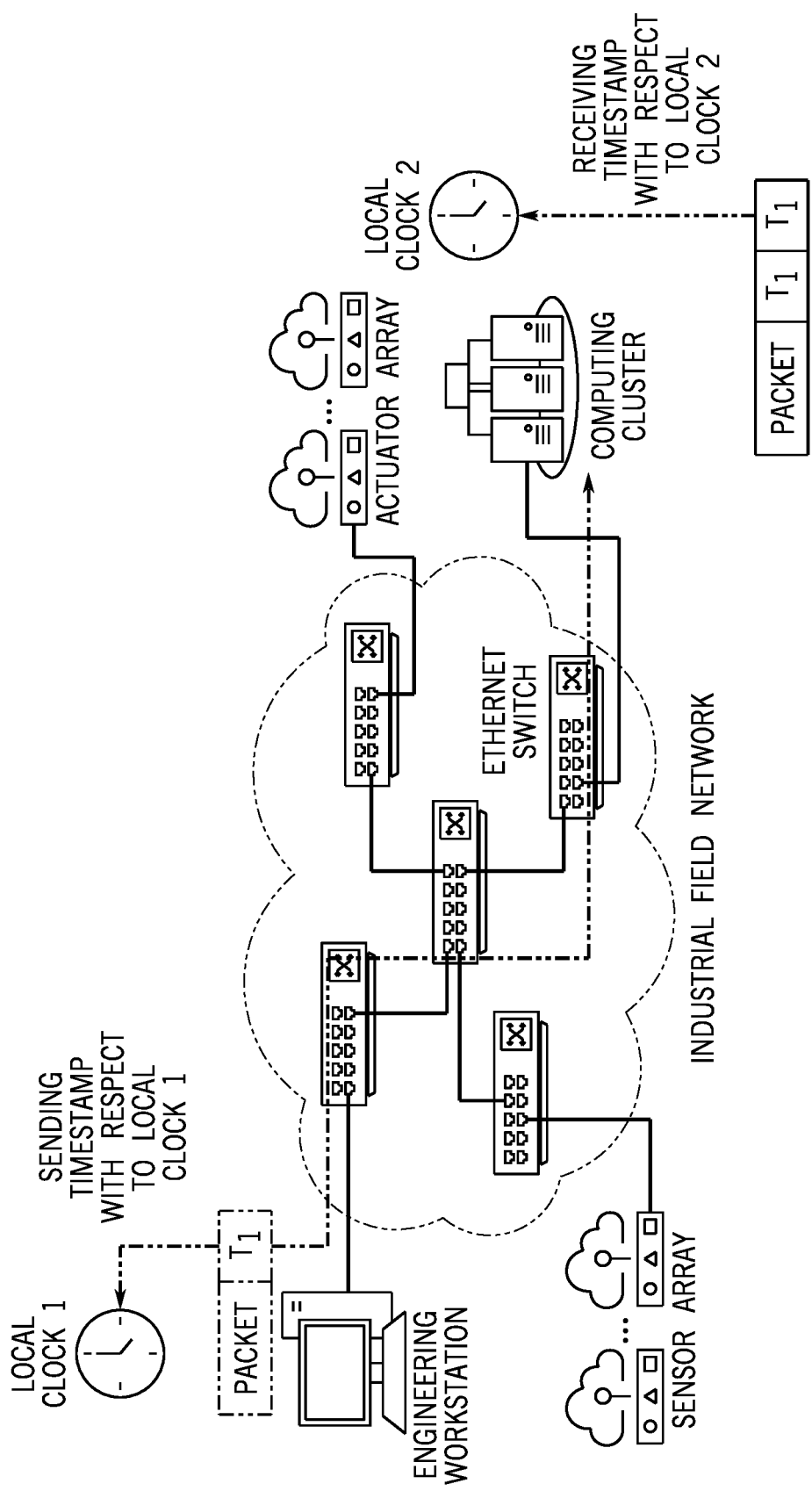
FIG. 2 illustrates end-to-end delay measurement using sending and receiving timestamps.

Referring to FIG. 2, an engineering workstation is connected to a computing cluster through multiple switches (device 10). Each of the workstation and the computing cluster have a local clock 52. The end-to-end transmission delay experienced by the packet 58 sent by the engineering workstation can thus be computed by T2–T1, where T1 is the timestamp using the local clock 52 of the engineering workstation, and where T2 is the timestamp of the local clock 52 at the computing cluster. However, it should be noted that the accuracy of this approach is determined by the quality of the sending timestamp T1 and receiving timestamp T2. A major factor impacting the quality of T1 and T2 is the accuracy of their respective reference clocks, i.e., local clock 1 and local clock 2 are synchronized. Suppose $T_1 = t_1 + \tau_1$, and $T_2 = t_2 + \tau_2$, where $t_i$ is the Coordinated Universal Time (UTC), $\tau_1$ is the drift of local clock 1, and where $\tau_2$ is the drift of local clock 2. The delay is calculated by $$\Delta = T_2 - T_1 = (t_1 + \tau_1) - (t_2 + \tau_2) = (t_1 - t_2) + (\tau_1 - \tau_2) = \Delta_0 + \Delta',$$

where $\Delta_0 = t_1 - t_2$ is the actual time delay between the two end nodes, and $\Delta' = \tau_1 - \tau_2$ is the error caused by local clock drifting. The error $\Delta'$ can range from <100 ns (in fully synchronized PTP network) to 1 ms (NTP in LAN), 10 s of milliseconds in WAN or even seconds in not appropriately synchronized networks.

Figure 3:
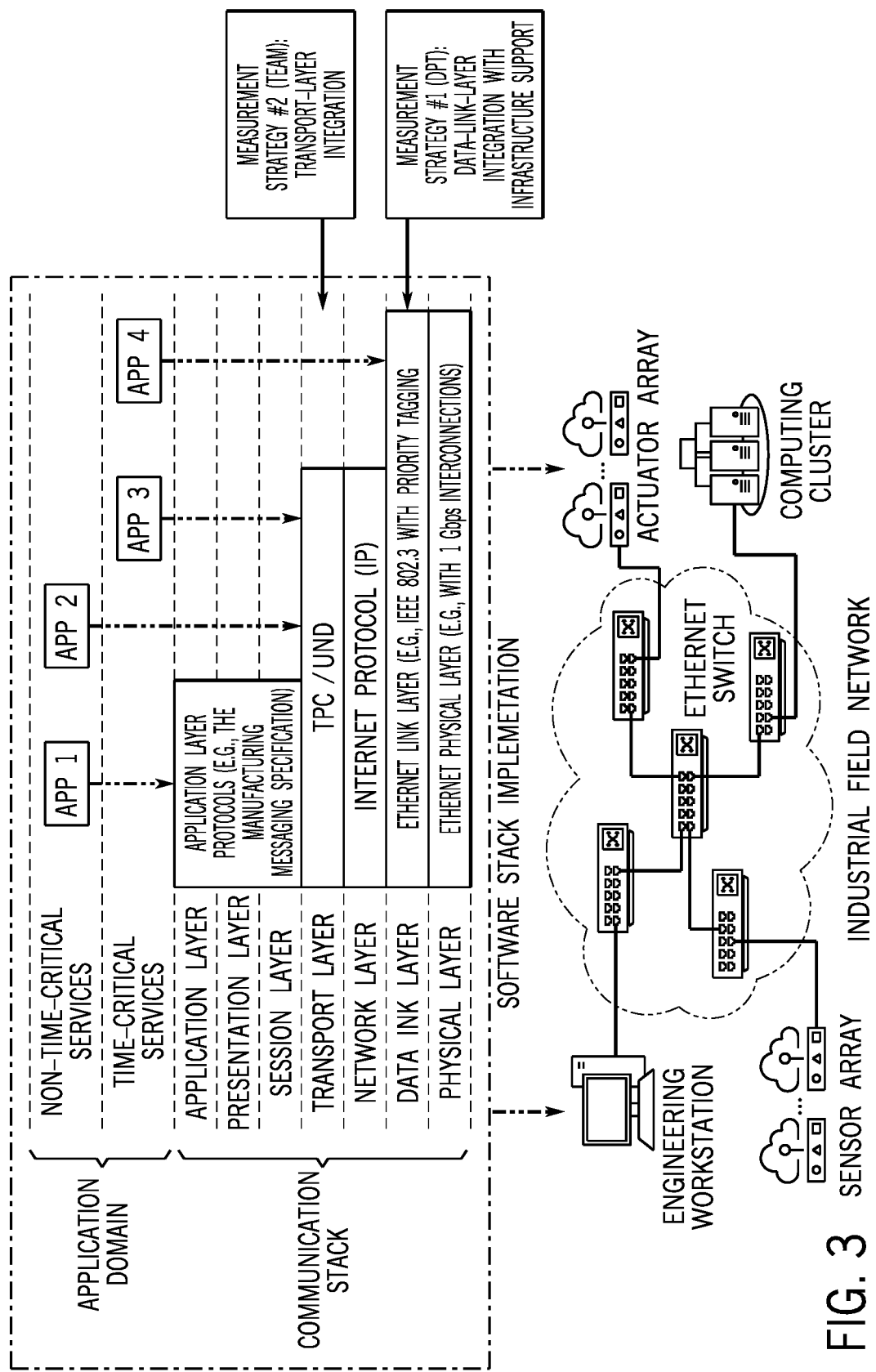
FIG. 3 illustrates the proposed delay measurement strategies, DPT and TEAM, for TSN.

Referring now to FIG. 3, the present invention contemplates two methods for estimating channel delay depending on the availability of precisely synchronized clocks and the demands for delay accuracy. The first method is termed the Data-link-layer Precision Trailer (DPT) method and is suitable for use when highly accurate clocks are available, e.g., Precision Time Protocol (PTP) synchronized network and IRIG-B synchronized LAN. The second technique is termed the Transport-layer End-to-end Active Messaging (TEAM) and provides delay measurements when precision clocks are not available or lower quality measurements can be accommodated. Variously, these techniques address multiple components of delay including:

the propagation delay, the signal propagation on the media, i.e., cables, fiber, air (wireless), approximately 1 ns per foot of distance between the transmitter and the receiver;

the wire processing delay, the physical media handle the bitstream equal to the $$\frac{\text{packet lengh}}{\text{wire speed}},$$

for a 100 Mbps network it will be 10 ns per bit and for a 1 Gbps network, it will be 1 ns per bit;

the switch processing delay, the processing time required by switching and routing operations (e.g., CRC checksum verification, route matching, etc.), normally within 1 μs; and the queuing delay, the time packets stay in a particular queue, awaiting processing (e.g., in an input queue) or transmission (e.g., in an output queue).

Referring still to FIG. 3, the DPT method involves adding a timestamp at the Data-Link-Layer with infrastructure support. Whereas the TEAM method involves adding a timestamp earlier at the Transport layer. The DPT method providing a timestamp closer to transmission on the physical media when sub-microsecond delay accuracy is required. The precision timestamp trailer will be attached to the Datalink layer frames by the firmware when they are transmitted. Delays can be obtained by calculating the difference between the local receiving time and the transmission timestamp carried in the frame trailer. To ensure measurement accuracy of hop-by-hop delays, all intermediate connection devices 10 (e.g., switches, routers) need to be synchronized with accurate time sources (local clocks) and be DPT ready; while for the end-to-end delay measurement, only the end devices, which have time-critical task requirements, need those requirements. An example network is the IEEE 1588v2 (PTP) enabled LAN in the substation protection networks, where all intermediary devices are required to be PTP compatible.

The TEAM method requires simpler software implementation appropriate for less stringent accuracy expectations. The TEAM solution is recommended especially when only a few end nodes (END), have time-critical task requirements and would like to monitor and estimate the delays among themselves. With the TEAM method, the end nodes exchange delay-measurement messages in the Transport layer to measure the end-to-end delays and then estimate the delay with the Network-Calculus-based Delay Bounding (NCDB) algorithm before the next exchange period. This method is widely applicable to most modern workstations and fast LANs systems with the potential accuracy level ranging from sub-microseconds to a few hundreds of microseconds, depending on the frequency of the delay measurement messages, the device data processing speed, the network topologies and protocols, and the network traffic conditions.

Figure 4:
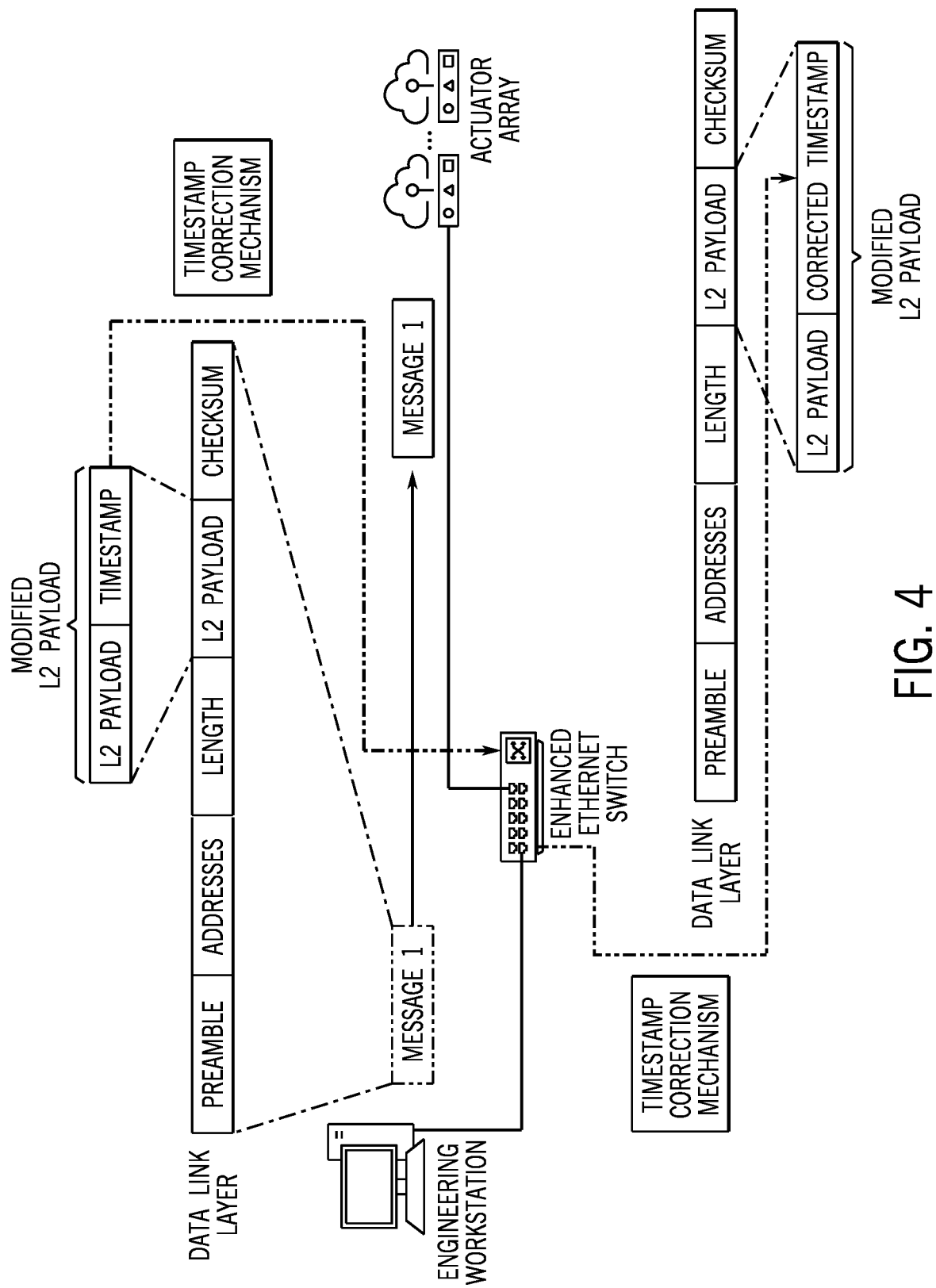
FIG. 4 illustrates a data frame layout diagram of the Data-link Precision Trailer (DPT) method.

Regarding FIG. 4, the implementation of the proposed DPT method with infrastructure support is shown. In the DPT method, a precision timestamp is attached to the Data-link layer frame by the transmitter. Then the intermediate devices and the receiver will retrieve the time stamp and compare it with its local time to obtain the delay to the original sender. The NCDB algorithm will be employed to estimate the delay between data link layer message intervals. To ensure 100-ns accuracy, all the end device and the intermediate networking devices (e.g., switches, bridges) need to be DPT compatible and synchronized with similar accuracy sources, e.g., synchronized with the IEEE 1588v2 (PTP) or directly through GPS clocks. Each intermediate device and end node will maintain a delay table to record its delay to other nodes of interest.

Figure 5:
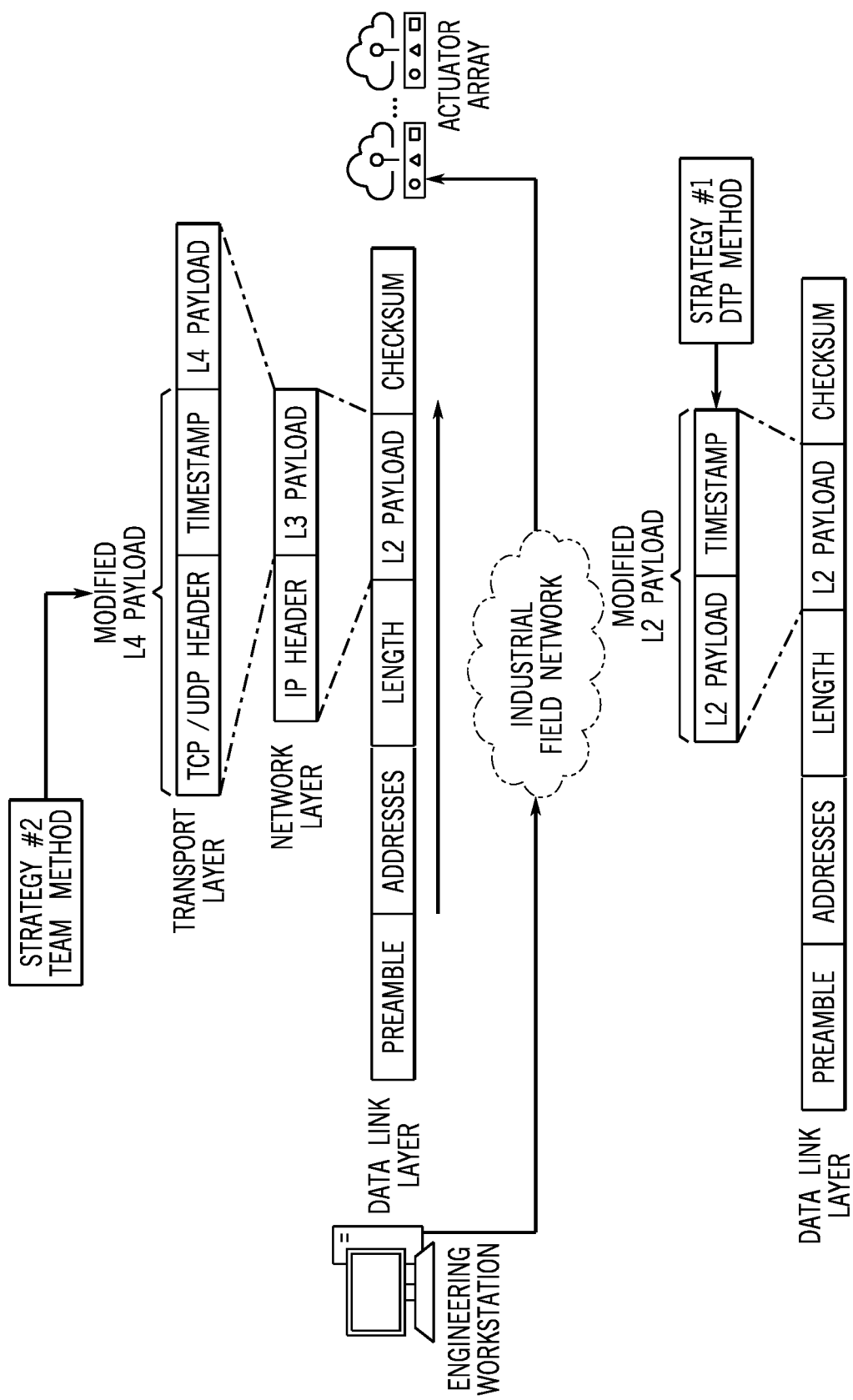
FIG. 5 illustrates the implementation of the TEAM method in terms of data frame layouts, with a comparison to the DPT method.

Regarding FIG. 5, the system implementation, in terms of data frame layouts, and deployment strategy for the TEAM method are depicted, with a comparison to the DPT method. The TEAM method has two different modes, TEAM-S and TEAM-A.

The TEAM-S mode is for networks with synchronization (e.g., NTP, IRIG-B, PTP, etc.) and frequent periodical communications, (e.g., SCADA data collection or other data aggregation communications). In TEAM-S, the sender will attach a timestamp to the transport layer payload of the periodically transmitted data segments. Then, the intermediate devices and the receiver will retrieve the timestamp and compare it with its local time to obtain the delay to the original sender. The NCDB algorithm will be employed to estimate the delay between the transport layer message intervals.

The TEAM-S method offers the solution to a TSN where the frequent periodical communication packets are sent among the active nodes, e.g., the GOOSE message, or the Sampled Measured Values (SMV) messages in IEC 61850, or a round-robin-sending scheme is scheduled (e.g., automotive and avionics networks using TSN). The TEAM-S method does not require installing extra hardware; only requires a firmware update of the Network Interface Controller (NIC). In a synced LAN network, sub-microsecond level accuracy can be achieved.

If the networks do not satisfy the requirements for TEAM-S, TEAM-A mode is recommended. TEAM-A mode is for networks without synchronization or frequent periodic communications. In this mode, Layer 4 active time synchronization messages are exchanged among the end devices (e.g., data sources and data sinks).

Figure 6:
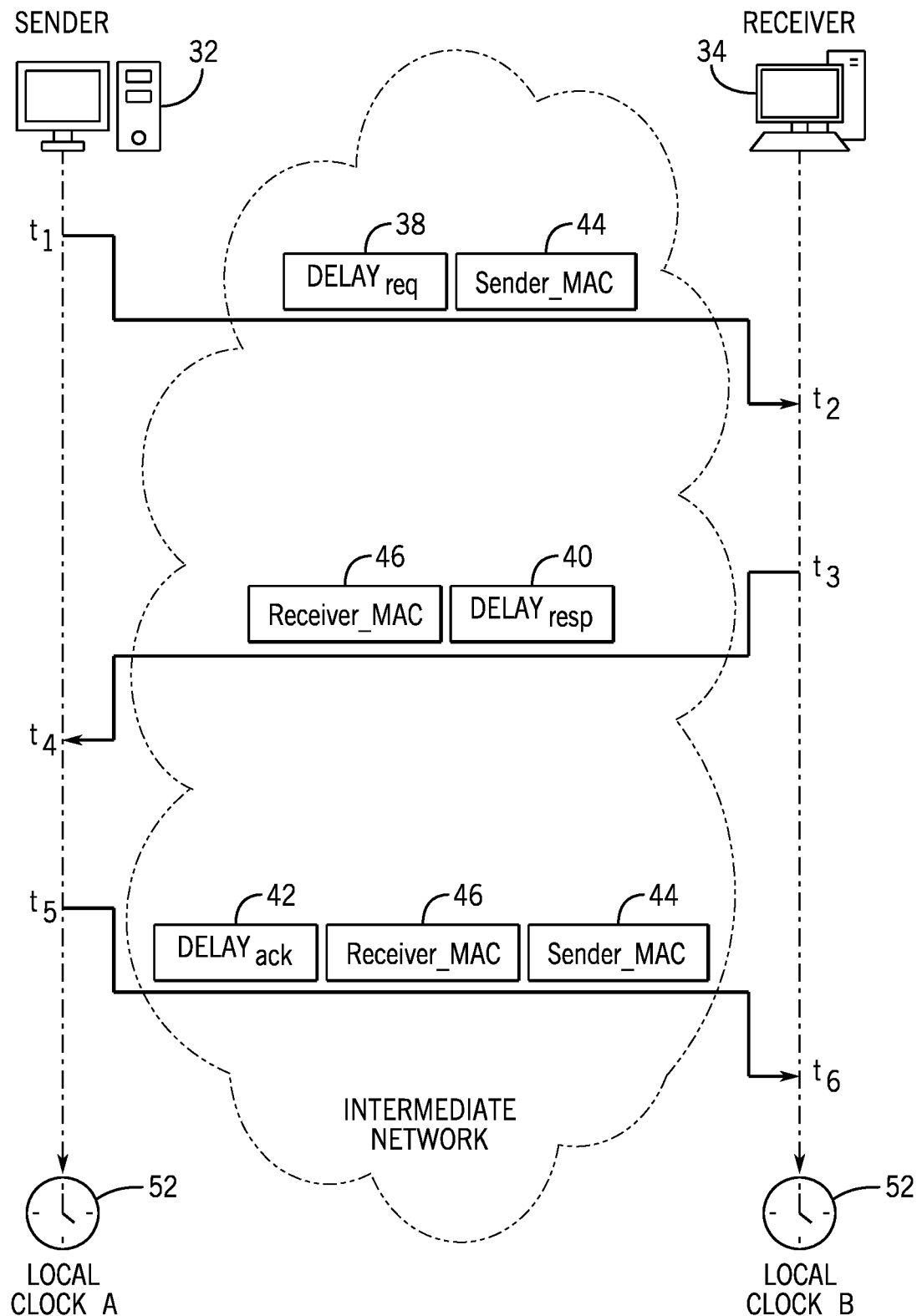
FIG. 6 illustrates end-to-end delay measurement for time synchronization.

Regarding FIG. 6, a sequence diagram of the implementation of the active path delay measurement mechanism in TEAM-A mode is shown. In TEAM-A mode, Layer 4 active time synchronization messages are exchanged between two end devices (e.g., a sender 32 and a receiver 34). Three types of synchronization messages are exchanged as follows. At time $t_1$ the sender sends the delay request message $delay_{req}$ 38 as a layer 3 multicast message with its network ID (MAC address) 44. The subscribers 34 receive the request message 38 and immediately send the delay response message $delay_{resp}$ 40 as a layer 3 unicast message with their network ID (MAC address) 46 back to the sender 32. After receiving a response message 40, the sender 32 will complete the communication with a unicast layer 3 delay ACK message $delay_{ack}$ 42 to the corresponding receiver 34. The $delay_{ack}$ 42 message contains both the sender's and the receiver's network IDs 44, 42. If the sender 32 has multiples receivers 34, it will reply to each of the receivers 34 after receiving their $delay_{resp}$ 40.

The sender 32 will obtain the delay by the delay=$(t_4-t_1)\div2$ and update its delay estimation to that specific receiver's network calculus model. In the meantime, after receiving the $delay_{ack}$ message 42, the receiver 34 can also calculate the delay between itself and the sender 32 by delay=$(t_6-t_3)\div2$ and update its delay model 48. Since the delay is an average of the round trip and contains the processing time of the end nodes, i.e., $t_{receiver\_processing}=t_3-t_2$ or $t_{sender\_processing}=t_5-t_4$, the accuracy of TEAM-A depends on the symmetry of the network, the traffic patterns, the data processing speed of the end nodes, etc. In a well-balanced and non-congested LAN, the accuracy of the TEAM-A method normally ranges from tens of microseconds to sub-millisecond levels.

While delay measurements are taken as described above (i.e., either the DPT or the TEAM method), worst-case end-to-end delay estimation is enabled by a formal theory on deterministic queueing behaviors of networking devices, i.e., network calculus. In this invention, the Network-Calculus-Based Delay Bounding (NCDB) algorithm is utilized as illustrated in FIG. 7.

Figure 7:
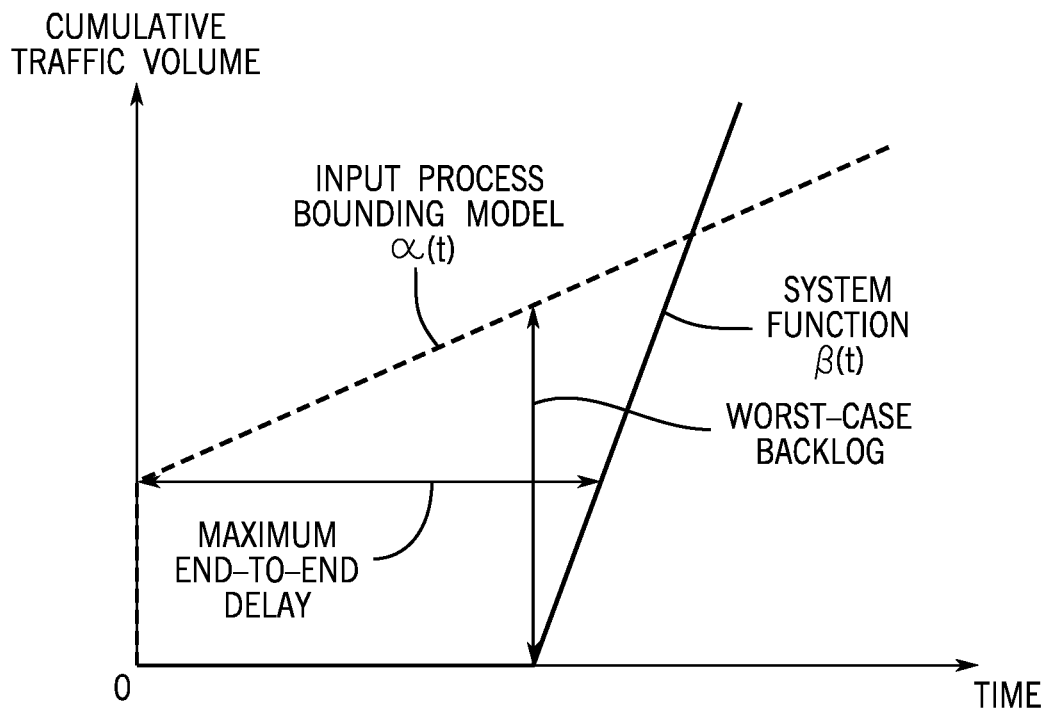
FIG. 7 is a graph of the Network-Calculus Delay Bounding (NCDB) Principle.

Regarding FIG. 7, the NCBD principle is shown. Because the proposed measurement method can monitor the network communication stack, it establishes an upper-bounding envelope model for an input process representing a traffic flow generated by the sender of interest. Suppose that the network is monitored since time instant t=0 and that the cumulative traffic volume generated by the sender of interest up to time t is denoted by F(t) (with t≥0). The bounding model α(t) for input process F(t) can thus be defined by:

$$\forall t \geq s \geq 0 : F(t)-F(s) \leq \alpha(t-s).$$

To estimate worst-case delays, a leaky bucket bounding model is adopted for the input process, and their parameters can be determined and periodically updated using the measurement method. Given a network that sits between the pair of end devices of interest, its transmission properties with its input and output processes can be characterized. Using the proposed method, the algorithm can establish models for these two processes, which allows for further modeling of the intermediate network using a system function β(t). To estimate end-to-end delays, the rate-latency model for network system functions is adopted. As shown in FIG. 7, the maximum delay experienced by packets 58 passing through an intermediate network of interest is upper bounded by the maximum horizontal distance between the network-calculus bounding model for the input process and the network-calculus system function for the network.

Figure 8:
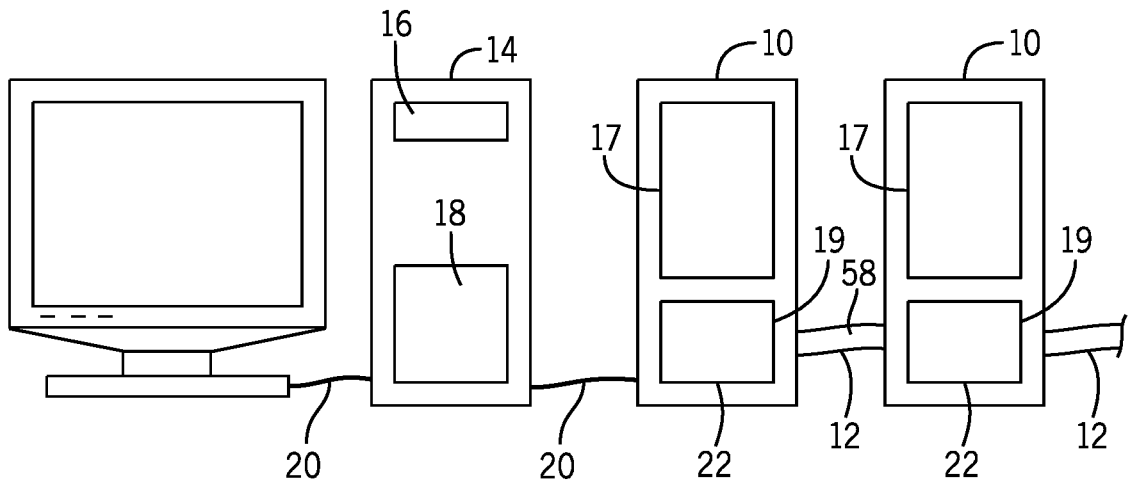
FIG. 8 is a simplified illustration of a router and computer.

Regarding FIG. 8, a simplified diagram of a bridge 10 and computer 14 is shown. The simplified computer 14 contains a processor 16, memory 18, and an internet connection 20. The simplified bridge 10 also contains a processor 17, memory 19, and an internet connection 20. The computer 14 is in communication with the bridge 10 via the internet connection 20. When a user accesses the internet on the computer 14, the router 10 communicates with other bridges 10 via channels 12 and sends the information in packets 58 to their destination. When running one of the proposed protocols, the bridge 10 accesses a program 22 stored in its memory 19.

The delay measurement method focuses on timestamp embedding strategies while considering the implied time synchronization and timestamp correction needs. Different timestamp embedding strategies are introduced for different measurement scenarios. To further elaborate on how clock synchronization and timestamp correction can be achieved the assumptions on the time synchronization capabilities of the underlying network infrastructure for different measurement modes are summarized in Table 1 below.

| Timestamp Embedding Strategy | Time Synchronization Capabilities of Underlying Network Infrastructure | Approximate local time accuracy (τ) | Timestamp Correction Required (Y/N) |
|---|---|---|---|
| Transport Layer End-to-End Active Messaging with Synchronization (TEAM-S) | Local-area network (LAN) with switches functioning as IEEE 1588v2 transparent clocks | 100 ns | N* |
| | LAN with switches functioning as IEEE 1588v2 boundary clocks | 100 ns | N |
| | LAN with a Network Time Protocol (NTP) server, or IRIG-B, and necessary services support | <100 μs | N |
| Transport Layer End-to-End Active Messaging without Synchronization (TEAM-A) | LAN without accurate time synchronization support, or wide-area network (WAN) crossing multiple time-synchronization domains | >1 ms | Y |
| Datalink-layer Precision Trailer (DPT) Method | LAN with accurate time synchronization support (e.g., IEEE 1588v2, IRIG-B, and etc.) | 100 ns | N |
| | LAN without accurate time synchronization support, or wide-area network (WAN) crossing multiple time-synchronization domains | >1 ms | Y |

Table 1 considers the IEEE 1588v2 (PTP) and IRIG-B clock synchronization mechanisms, which are widely used in industry and documented. Such a time synchronization mechanism ensures that devices deployed in a networked system are all synchronized to the same wall clock (though the IEEE 1588v2 offers much higher synchronization accuracy than NTP). Timestamp correction is not needed under such scenarios because they can safely assume that sending and receiving ends of interest are synchronized with an accuracy level that is sufficient for the applications running on the networked system. For example, as separately listed in Table 1, in the IEEE 1588v2 transparent clock mode, each Ethernet switch will automatically take timestamps for IEEE 1588v2 messages at their ingress and egress points. The processing time induced by the Ethernet switch can thus be calculated, and the timestamp in the messages can be properly adjusted to account for clock fluctuations caused by network message processing.

As shown in Table 1, the proposed method can be applied to networks without accurate synchronization mechanisms. In these cases, the proposed method must incorporate its own time synchronization and timestamp correction mechanism, which utilizes modified SNTP protocol. Instead of requiring a server clock in SNTP/NTP, the users can choose between synchronization mode or correction-only mode.

In synchronization mode, all the end nodes will be synchronized with a reference node (master clock). Once time synchronization is realized, timestamp correction is automatically achieved. While in correction-only mode, each pair of nodes only calculate the time offsets to correct the timestamps between themselves.

After timestamp correction, the end-to-end network delay can be calculated by $\Delta = T_2 - T_1$. The proposed timestamp correction has similar accuracy as NTP and offers an accuracy of 1 ms or less in LAN.

Further elaborating on synchronization mode, as shown in Table 1, the following synchronization mechanism applies to both the TEAM-A method without time synchronization and the DPT method without time synchronization. Under both scenarios, our time synchronization mechanism works in two steps. First, the distributed deployed devices collaboratively elect a master clock 50, whose clock will be regarded as the wall clock of the networked system. The clock election process will be discussed in FIG. 9. Then, before starting the TEAM-A or the DPT delay measurement operations, the sending and receiving devices of interest will run the active path delay measurement method proposed in this invention to first synchronize their clocks with the master clock 50. This step is illustrated in FIG. 6.

Figure 9:
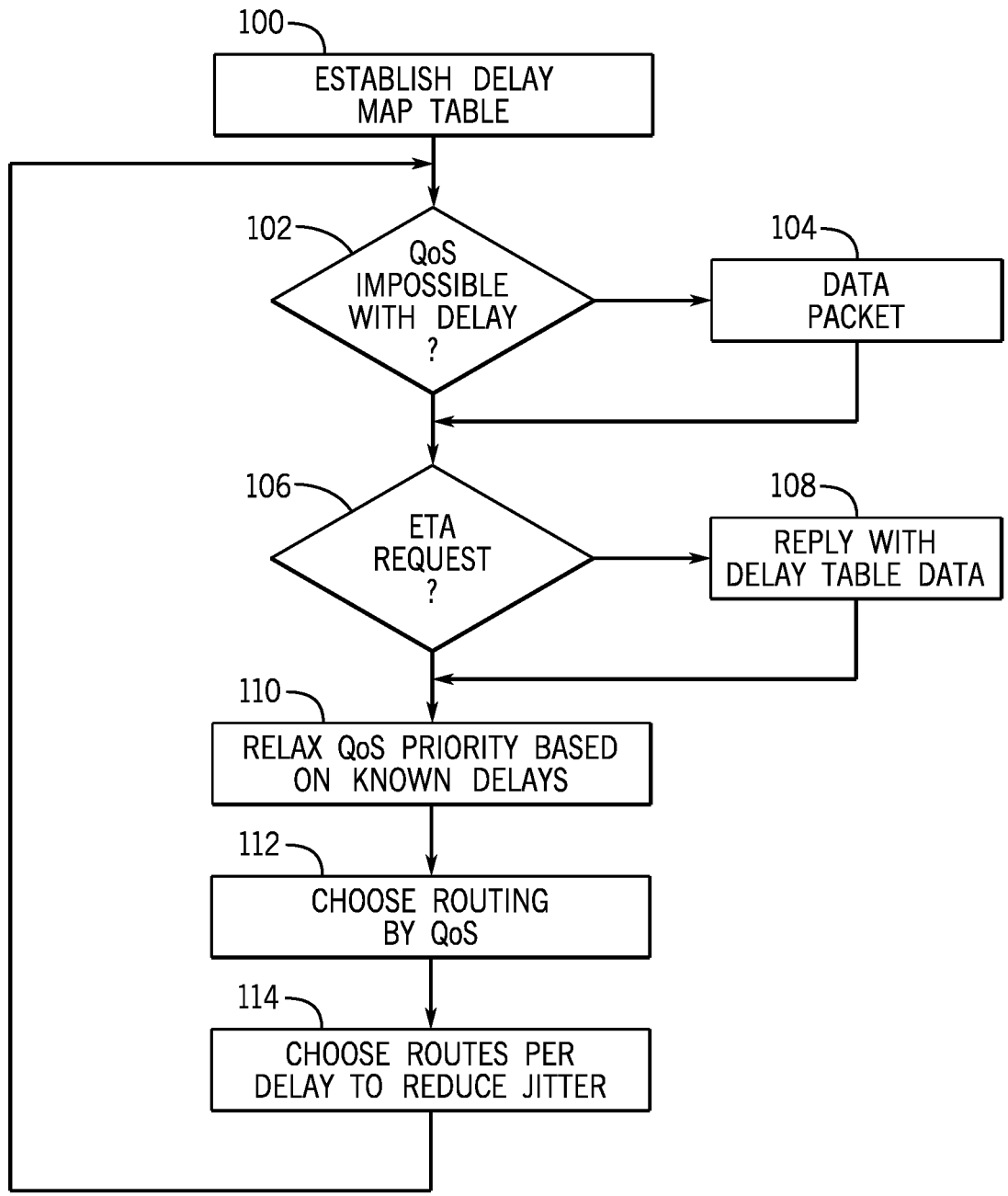
FIG. 9 is a flowchart showing use of the network delay map to inform switching/routing decisions.

Referring now to FIG. 9, each intermediary device 10 may execute a program 20 stored in bridge memory 19 which per process block 100 may implement the above-described delay calculations to create a delay table 48 in bridge memories 19 that provides a real-time delay value 56 for each path 12 connected to the intermediary device 10. This table may be updated on regular intervals as a background matter.

At decision block 102 an arriving packet with a QoS requirement may be evaluated against the known delay on the path 12 of its next hop provided from the table generated at process block 100. If, based on this delay information, it is evident that the QoS requirements for the packet 58 will not be met, the packet 58 may be dropped, as indicated by process block 104, thus freeing up channel capacity for future low latency packets.

As indicated at process block 106, the intermediary device 10 may receive a request for an estimated time of arrival for a packet 58 and in response, as indicated by process block 108, may provide delay information for its associated paths 12 and obtained from the delay table 48 in a reply message and may forward this message downstream to later intermediary device 10. The delay information from each intermediary device 10 receiving the request may be collected at the requesting device to construct an estimated time of arrival for the packet 58 by simple summation.

As indicated by process block 110, the knowledge of the delays along an entire transmission path for particular packet 58 (for example assembled through an estimated time of arrival calculation) may be used to relax the QoS priority for any packet 58 when it can be determined from the known delays that that relaxed priority will still meet the QoS requirements. In this way, resources for other packets 58 (for example earlier places in buffer queues) can be given to packets 58 where those resources are required.

As indicated by process block 112, knowledge of the delays on different paths 12 of a given intermediary device 10, may be used to inform the routing of a particular packet by that intermediary device 10, for example, routing packets 58 with high latency tolerance to longer delay paths 12 to reduce the congestion on the shorter delay paths 12 for higher priority packets 58.

Finally, as indicated by process block 114, knowledge of the delays on alternative paths 12 from a given intermediary device 10 may be used to perform load balancing, hence reducing the jitter of a packet stream. The essential jitter reduction mechanism enabled by the present invention lies in the creation and continuous updates of an estimated path delay map, which is collaboratively maintained by all the network devices 10 (i.e., intermediary devices and end nodes). For example, when a delay-sensitive packet 58 is predicted to experience a higher delay (and thus an increased jitter), independent forwarding decisions taken at each intermediary device 10 will attempt to reduce the jitter by forwarding the packet to an alternative path 12 with lower expected delays.

It is to be understood that the method steps, processes, and operations described herein are not to be construed as necessarily requiring their performance in the particular order discussed or illustrated, unless specifically identified as an order of performance. It is also to be understood that additional or alternative steps may be employed.

It is specifically intended that the present invention not to be limited to the embodiments and illustrations contained herein and the claims should be understood to include modified forms of those embodiments including portions of the embodiments and combinations of elements of different embodiments as come within the scope of the following claims.

To aid the Patent Office and any readers of any patent issued on this application in interpreting the claims appended hereto, applicants wish to note that they do not intend any of the appended claims or claim elements to invoke 35 U.S.C. 112(f) unless the words "means for" or "step for" are explicitly used in the particular claim.

We claim:

1. A network delay estimation system comprising:
a set of nodes providing packet handling circuitry and inter-communicating via communication lines to transmit data packets between nodes, the set of nodes and communication lines providing alternative paths of nodes between a given source and destination node allowing switching/routing decisions;
wherein the nodes execute stored programs to collectively:
(a) measure transits time of data packets between nodes to dynamically establish a map of the entire set of nodes as interconnected between the given source and destination node, the map providing the measured varying delays including a transmission time from a first transmitting node to a receiving time for a second receiving node for each pair of interconnected nodes, the measurement of the transmission time being independent of queuing delays in the first transmitting node and second transmitting node;
(b) communicate the map providing the measured delays to the interconnected nodes; and
(c) employ the map at the nodes in switching/routing packets between the alternate paths of nodes based on the measured delays along the entire set of nodes.

2. The network delay estimation system of claim 1 wherein the nodes establish the map by transmitting packets time stamped as they leave a first node and time recorded as they arrive at a second node to deduce a delay being the difference between these times.

3. The network delay estimation system of claim 1 wherein the nodes implement a network calculus on the map to produce the set of flow-specific worst-case delays.

4. The network delay estimation system of claim 2 wherein the time stamping occurs at a transport layer of the node communication.

5. The network delay estimation system of claim 2 wherein a time stamping occurs at a data link layer.

6. The network delay estimation system of claim 1 wherein the switching/routing of frames/packets selects from packets according to those having an earliest packet delivery expiration time.

7. The network delay estimation system of claim 1 wherein the switching/routing of frames/packets uses the map to prioritize packets according to dynamic QoS (quality of service) values.

8. The network delay estimation system of claim 1 wherein the switching/routing of frames/packets drops frames/packets which are expected to be expired at the destinations according to a network calculus on the map.

9. The network delay estimation system of claim 1 wherein the switching/routing of frames/packets organizes the frames/packets to minimize a variation in delay of frames/packets associated with a given stream.

10. The network delay estimation system of claim 1 wherein the switching/routing of frames/packets organizes the frames/packets to detect abnormal delays of frames/packets associated with a given stream, which could be results of physical interference, or device failure, or network attacks.

* * * * *